United States Patent [19]
Raaymakers et al.

[11] Patent Number: 5,339,301
[45] Date of Patent: Aug. 16, 1994

[54] OPTICALLY READABLE RECORD CARRIER FOR RECORDING INFORMATION, METHOD AND APPARATUS FOR MANUFACTURING SUCH, APPARATUS FOR RECORDING AND READING INFORMATION ON A SUCH A RECORD CARRIER

[75] Inventors: Wilhelmus P. M. Raaymakers; Franciscus L. J. M. Kuijpers; Aartje W. Veenis; Johannes H. T. Pasman; Hendricus A. M. Mulder, all of Eindhoven, Netherlands

[73] Assignee: U.S. Philips Corporation, New York, N.Y.

[21] Appl. No.: 99,770

[22] Filed: Jul. 29, 1993

Related U.S. Application Data

[63] Continuation of Ser. No. 430,918, Oct. 31, 1989, abandoned, which is a continuation of Ser. No. 105,064, Oct. 5, 1987, abandoned, which is a continuation-in-part of Ser. No. 15,454, Feb. 17, 1987, abandoned.

[30] Foreign Application Priority Data

Oct. 6, 1986 [NL] Netherlands .......................... 8602504
Mar. 20, 1987 [NL] Netherlands .......................... 8700655

[51] Int. Cl.$^5$ ............................................. G11B 7/00
[52] U.S. Cl. ................................. 369/50; 369/44.26; 369/275.3; 369/275.4; 369/278; 358/342
[58] Field of Search .................... 369/47, 48, 50, 51, 369/59, 124, 277, 278, 275.3, 275.4, 44.25, 44.26, 44.34, 44.39; 360/27, 71, 72.1, 72.2; 358/342

[56] References Cited

U.S. PATENT DOCUMENTS

| | | | |
|---|---|---|---|
| 3,962,720 | 6/1976 | Braat | 369/278 X |
| 3,963,862 | 6/1976 | Bouwhuis . | |
| 4,067,044 | 1/1978 | Maeda et al. | 360/72.1 X |
| 4,238,843 | 12/1980 | Carasso et al. | 369/59 X |
| 4,326,282 | 4/1982 | Verboom et al. | 369/59 X |
| 4,363,116 | 12/1982 | Kleuters et al. | 369/47 X |
| 4,366,564 | 12/1982 | deHaan et al. | 369/48 |
| 4,513,407 | 4/1985 | Bricot | 369/277 X |
| 4,615,753 | 10/1986 | Gregg | 369/275 X |
| 4,682,317 | 7/1987 | Tomisawa | 369/59 |
| 4,716,560 | 12/1987 | Itonaga | 369/44 X |
| 4,719,594 | 1/1988 | Young et al. | 369/277 X |
| 4,819,223 | 4/1989 | Gregg | 369/275 |

FOREIGN PATENT DOCUMENTS

0124950 11/1984 European Pat. Off. .
2022875 12/1979 United Kingdom .................. 369/59
2069219 8/1981 United Kingdom .

OTHER PUBLICATIONS

Patent Abstracts of Japan, vol. 3, No. 90 (E-127), Jul. 31, 1979, & JP-54-68610, Jan. 6, 1979.
Patent Abstracts of Japan, vol. 8, No. 199 (P-380) [1922], Aug. 16, 1985, & JP-60-63733, Apr. 12, 1985.
Patent Abstracts of Japan, vol. 8, No. 92 (P-271) [1529], Apr. 27, 1984, & JP-59-5449, Jan. 12, 1984.

*Primary Examiner*—W. R. Young
*Attorney, Agent, or Firm*—Leroy Eason

[57] ABSTRACT

A record carrier on which information may be optically recorded and/or read, having a disc-shaped substrate with a spiral or concentric pattern of preformed tracks thereon and a radiation-sensitive layer extending over such track pattern. The tracks are in the form of ridges of substantially constant width and having a periodic radial wobble of a substantially constant mean frequency, which frequency is modulated by a position-information signal identifying the relative positions of the tracks in the track pattern. Apparatus for forming such a track pattern includes means for modulating the radial track wobble in accordance with the position-information signal. Apparatus for reading an information signal recorded on such a record carrier includes an FM demodulator for recovering the position-information signal from variations in the reflected scanning beam produced by the track modulation, and which also recovers from such variations a clock signal corresponding to the mean frequency of such modulation and which is used to control the scanning velocity. Apparatus for recording an information signal on such a record carrier includes an FM demodulator for recovering the position-information signal from variations in the radiation reflected from the tracks during recording.

5 Claims, 3 Drawing Sheets

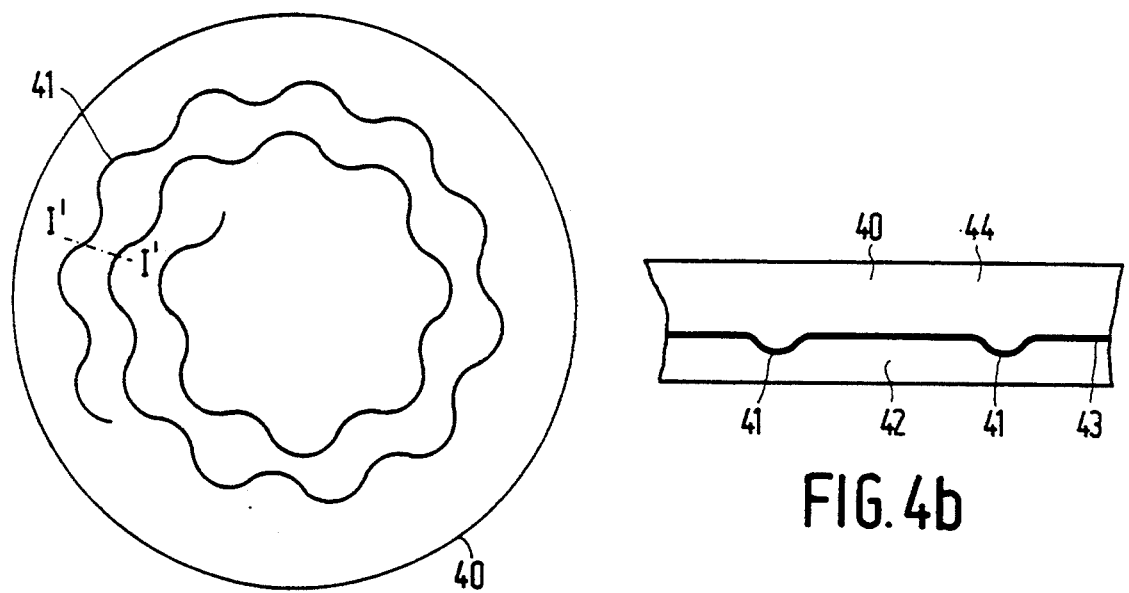
FIG. 4b
FIG. 4a
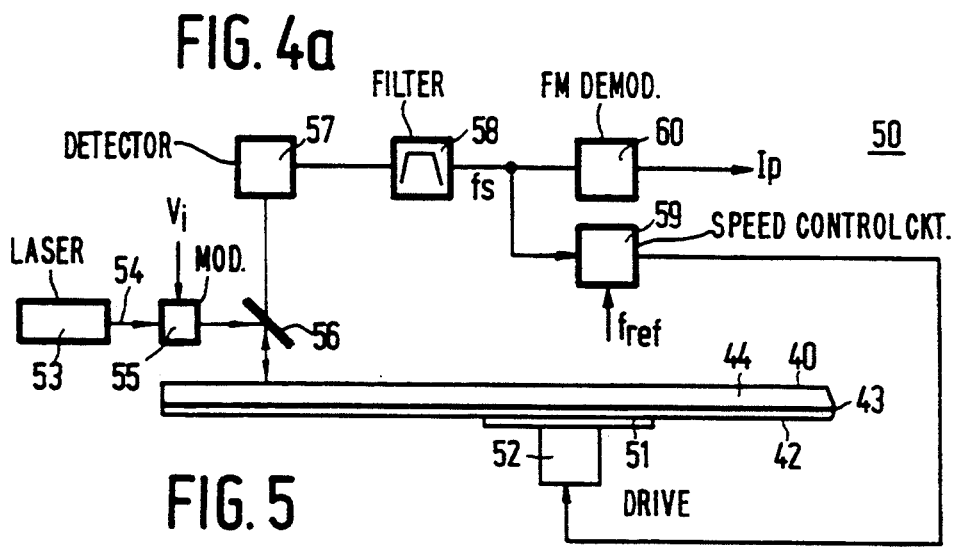
FIG. 5
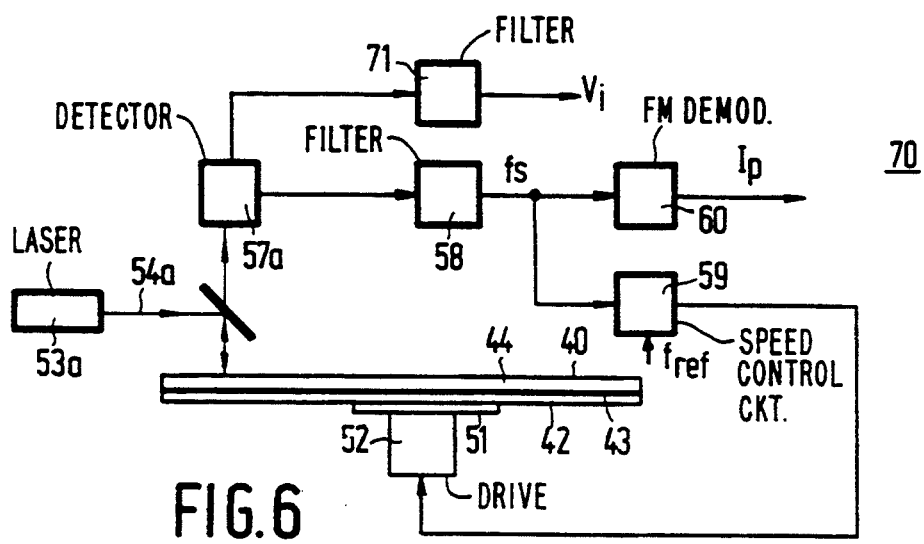
FIG. 6

OPTICALLY READABLE RECORD CARRIER FOR RECORDING INFORMATION, METHOD AND APPARATUS FOR MANUFACTURING SUCH, APPARATUS FOR RECORDING AND READING INFORMATION ON A SUCH A RECORD CARRIER

This is a continuation of application Ser. No. 07/430,918, filed Oct. 31, 1989, which is a continuation of application Ser. No. 105,064, filed Oct. 5, 1987, which is a continuation-in-part of application Ser. No. 015,454, filed Feb. 17, 1987, all now abandoned.

The invention relates to an optically readable record carrier comprising a radiation/sensitive layer upon a disc-shaped substrate and having an information recording area arranged in accordance with a spiral or concentric track pattern, which record carrier is intended for the recording and/or reproduction of information in the information recording area by means of a radiation beam, which track pattern exhibits a periodic track modulation for generating a clock signal for controlling the scanning velocity of the radiation beam.

The invention further relates to a method and an apparatus for manufacturing such a record carrier, comprising a writing device for writing the track pattern by means of a radiation beam and a control device for generating a periodic control signal for the writing device so as to obtain a track modulation whose frequency is modulated by the periodic control signal.

The invention further relates to an apparatus for recording information on such a record carrier, comprising means for scanning the information recording area by means of a radiation beam, a modulation device for modulating the radiation beam intensity with an information signal, and an optical system with a detector for detecting the radiation reflected or transmitted by the record carrier during scanning.

The invention also relates to an apparatus for reading such a record carrier, on which an information signal has been recorded in the information recording area, comprising a scanning device for scanning the information recording area with a radiation beam at a substantially constant velocity by means of a radiation beam, an optical system with a detector for detecting the radiation reflected or transmitted by the record carrier during such scanning, and a device for recovering from the radiation detected by the detector an information signal representing the recorded information.

DESCRIPTION OF THE RELATED ART

Such a record carrier and such apparatuses are known from the Applicant's published West German Offenlegungsschrift no. 3100421 which corresponds to pending U.S. application Ser. No. 110,063, filed Oct. 8, 1987, which is a continuation of application Ser. No. 134,392, filed Mar. 26, 1980, both now abandoned.

The known record carrier has a spiral track which has a track modulation of constant frequency. As the spiral track is scanned by means of the radiation beam during reading and/or recording this track modulation produces a modulation of the reflected radiation beam. This modulation is detected and from the modulation thus detected a clock signal is derived which is utilized for controlling the recording and/or reading process.

Further, the spiral track is provided with information recording areas between which synchronization areas are interposed, the information recording areas being intended for the recording of information. The synchronization areas contain position information in the form of the address of the adjacent information recording area. The position information in the synchronization areas makes it possible to determine which part of the record carrier is being scanned from the reflected radiation beam during scanning. This enables a specific part of the disc to be located rapidly and accurately.

However, the known record carrier has the disadvantage that the information recording areas are constantly interrupted by synchronization areas. This is a drawback in particular when EFM-encoded information is to be recorded on the record carrier. This is because such a recording method requires an uninterrupted information recording area. EFM recording is a method by which 8 data bits at a time are translated into 14 channel bits for recording information on a compact digital disc. It is described, for example, in the article "Compact Disc: System Aspects and Modulation," Philips Tech. Rev. 40, No. 6, 1982.

SUMMARY OF THE INVENTION

It is an object of the invention to provide means which make it possible to record EFM encoded signals on an optical disc record carrier, and during scanning to determine from the light beam reflected by the record carrier which track on the disc is being scanned.

In accordance with a first aspect of the invention a record carrier of the type defined in the opening paragraph is characterized in that the frequency of the track modulation is a clock pulse which is modulated with a digital position-information signal. In accordance with a second aspect of the invention an apparatus for manufacturing the record carrier is characterized in that the apparatus comprises frequency-modulation means for frequency-modulating the clock signal with the digital position-information signal. In accordance with a third aspect of the invention an apparatus for recording information as defined in the foregoing is characterized in that the recording apparatus comprises an FM demodulation device for recovering the position-information signal from the frequency-modulated clock signal. In accordance with a fourth aspect of the invention an apparatus for reading information of the type defined in the foregoing is characterized in that the reading apparatus comprises an FM demodulation device for recovering the position-information signal from the frequency-modulated clock signal. During reading and/or recording this enables the clock signal to be generated, the position of the part of the disc being scanned to be determined, and the signal to be recorded and/or read simultaneously.

An embodiment of the record carrier in which the clock signal is utilized for controlling the velocity with which the information recording area is scanned by the radiation beam during recording and/or reproduction, is characterized in that at the nominal scanning velocity of the information-recording area the frequency components produced in the clock signal by the digital position-information signal are situated at least substantially outside the frequency band used for velocity control. As the frequency components caused by the track modulation are situated outside the frequency band used for velocity control the presence of these frequency components does not disturb velocity control.

Another attractive embodiment of the record carrier, in which the information recording area comprises a track modulation constituted by a periodic radial wobble of the track, is characterized in that the periodic wobble exhibits the frequency modulation. A further embodiment of the recorded carrier is characterized in that the track is constituted by substantially spiral-shaped or concentric ridges of substantially constant width, which ridges exhibit the radial wobble.

A further embodiment of the record carrier is characterized in that the width of the ridges is larger than the average width of the intermediate grooves. When an information structure formed recorded on the ridges is read, the influence of any irregularly shaped edges of the ridges, which irregularities may give rise to additional noise, is then minimal.

Such a record carrier having a ridge-like track of constant width can be manufactured by means of a method in which first a master disc is prepared from a substrate provided with a radiation-sensitive layer, by scanning such layer with a radiation beam along substantially concentric or spiral-shaped paths which exhibit a radial wobble, the scanned portions of the radiation-sensitive layer being removed by subsequently developing the radiation-sensitive layer of the substrate. This method is characterized in that the scanning path on the master disc is the complement of the desired path of the track on the record carrier to be manufactured therefrom. A record carrier with a track pattern which is the complement of the track pattern on the master disc is then produced from the master disc.

In the above method of manufacturing record carriers, having a track pattern of ridges of constant width the upper surfaces of the ridges corresponds to the bottoms of the grooves on the master disc. The bottoms of the grooves are the highly smooth surface of the substrate, that the corresponding upper surfaces of the ridges on the finished record carrier are also very smooth, resulting in very good reflection therefrom. Thus, during reading of an information structure recorded on the upper surfaces of the ridges a high signal level and hence a satisfactory signal-to-noise ratio are obtained.

Such a record carrier may alternatively be manufactured using a method in which a master disc provided with a track pattern is obtained by scanning a substrate provided with a radiation-sensitive surface layer with a radiation beam along a path corresponding to the desired spiral-shaped or concentric path of the track to be formed on the record carrier, which track is provided with a radial wobble. The non-exposed portions of the radiation-sensitive layer are subsequently removed by developing said layer, after which the record carrier is obtained by copying the track pattern on the master disc.

BRIEF DESCRIPTION OF THE DRAWINGS

Embodiments of the invention and further advantages thereof will now be described in more detail, by way of example, with reference to FIGS. 1 to 8, in which FIG. 5 shows an apparatus in accordance with the invention for recording an information signal, FIG. 6 shows an apparatus in accordance with the invention for reading an information signal.

DESCRIPTION OF THE PREFERRED EMBODIMENTS

Figure 1:
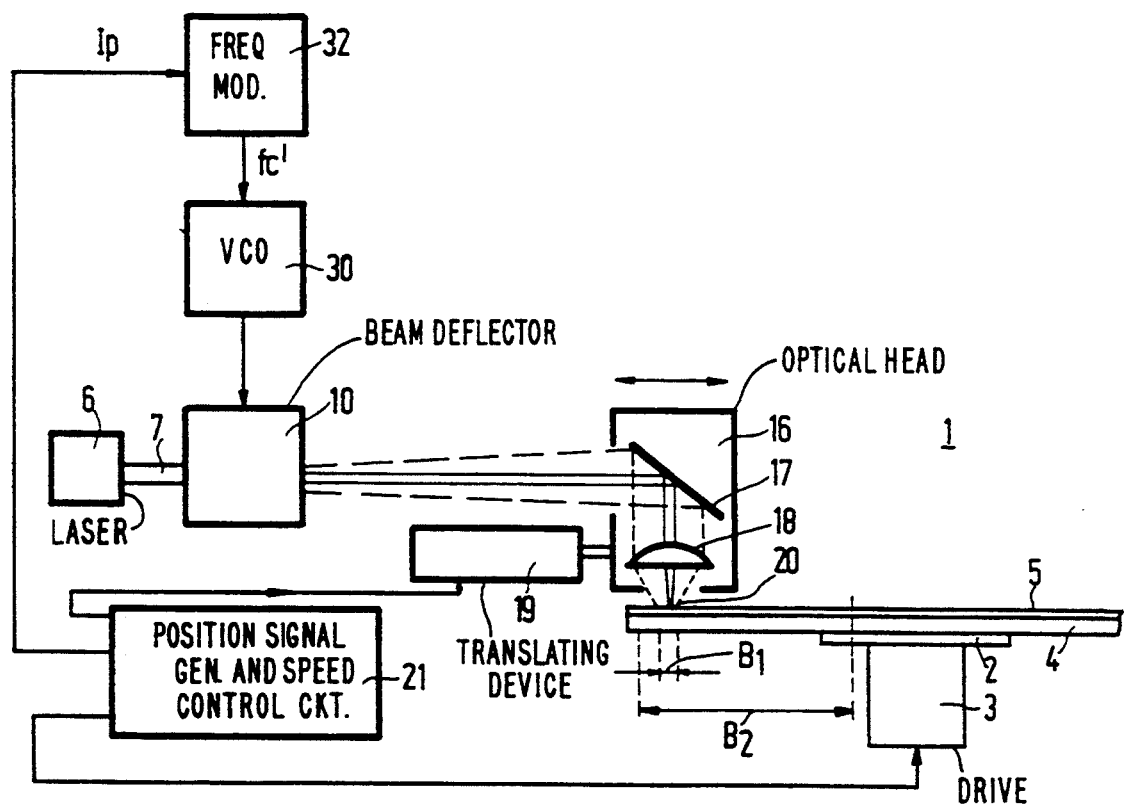
FIG. 1 shows an apparatus in accordance with the invention for manufacturing a record carrier.

FIG. 1 shows an apparatus for manufacturing a record carrier in accordance with the invention. The apparatus 1 comprises a turntable 2 which is rotated by a drive means 3. A disc-shaped substrate 4, for example a flat glass plate with a light-sensitive layer 5, for example in the form of a photoresist, can be placed on the turntable 2.

A laser 6 produces a light beam 7 which is projected on the light-sensitive layer 5. The light beam 7 is first passed through a beam deflection device 10. The deflection device 10 is of a type by means of which a light beam can be deflected very accurately within a narrow range. The apparatus described herein suitably employs an acousto-optical deflection device. However, it is alternatively possible to use other deflection devices, such as for example a mirror which is pivotable through a small angle, or an electro-optical deflection device. The dashed line in FIG. 1 indicates the limits of the deflection range. The light beam 7 deflected by the deflection device 10 is directed to an optical head 16. The optical head comprises a mirror 17 and an objective 18 for focussing the light beam on the light-sensitive layer 5. The optical head is radially movable relative to the rotating substrate 4 by means of a translating device 19.

By means of the optical system described above the light beam 7 is focused into a scanning spot 20 on the light-sensitive layer 5, the position of this scanning spot 20 being determined by the degree of deflection of the light beam 7 caused by the beam deflection device 10 and the radial position of the optical head 16 relative to the substrate 4. In the shown position of the optical head 16 the deflection device 10 can deflect the scanning spot 20 within a range indicated by B1. For this deflection range the scanning spot 20 can be moved over a range indicated by B2 by means of the optical head 16.

Further the apparatus 1 comprises a voltage-controlled oscillator 30, which generates a control signal for the beam deflection device 10. The beam deflection device 10 is of a customary type which deflects the light beam through an angle which is determined by the frequency of the control signal supplied by the voltage-controlled oscillator 30. A frequency modulator 32 causes the voltage-controlled oscillator, generate a signal whose frequency fc' is modulated with a position-information signal Ip generated by a control device 21. The control device 21 further controls the speed of the drive means 3 and the speed of the actuating device 19 in such a way that the radiation beam 7 scans the light-sensitive layer with a constant velocity along a spiral track. This control system falls beyond the scope of the present invention and is therefore not described in further detail.

Figure 2:
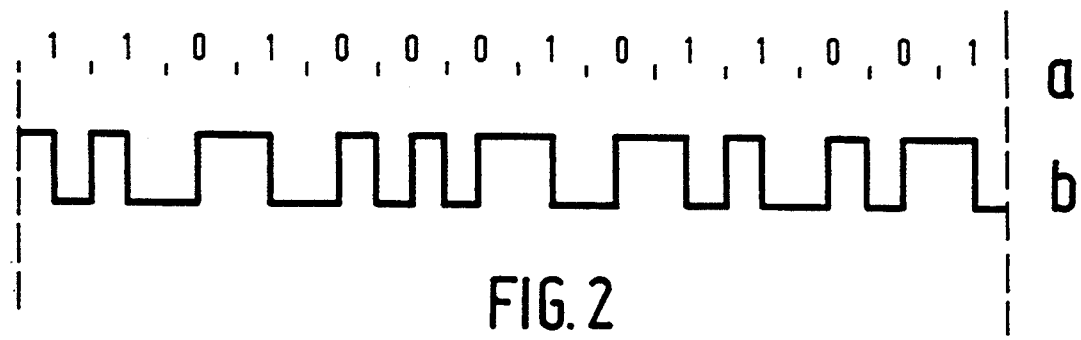
FIG. 2 shows a signal Ip generated in the apparatus shown in FIG. 1.

The position-information signal Ip is a binary signal consisting of a sequence of bit cells having a logic value "1" or "0", which signal represents a sequence of digital time-information words. These time-information words indicate the time expired since the beginning of the scanning operation. An example of such a signal Ip is shown in FIG. 2b, a part of the time-information word represented by the signal Ip being shown in FIG. 2a.

Figure 3:
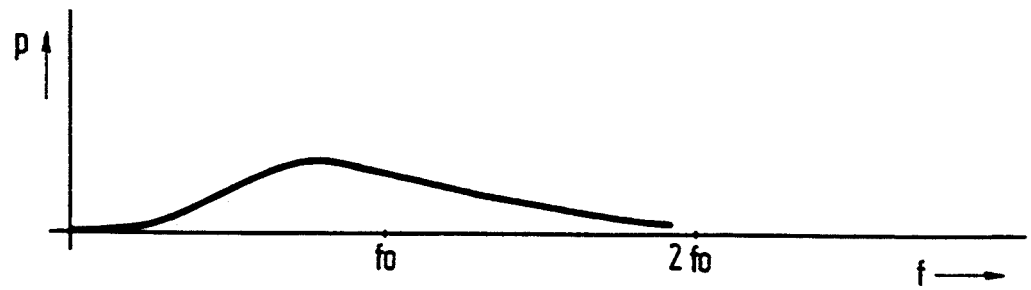
FIG. 3 shows the frequency spectrum of the signal Ip in FIG. 2, FIG. 4(a,b) shows a record carrier in accordance with the invention.

The position-information signal Ip exhibits a "biphase" modulation. The applied digital signal is then converted into a binary signal which is positive during the time interval T/2 for a logic "one" of the applied digital signal and which is negative during the next time interval T/2, T being the bit period of the applied digital signal. A logic "zero" results in the opposite binary signal, i.e. one which is negative during the time interval T/2 and positive during the next time interval T/2. This modulation technique yields a binary signal having a power-distribution frequency spectrum as shown in FIG. 3. Here the frequency fo corresponds to 1/T.

As is apparent from FIG. 3, such a "biphase" modulated signal does not exhibit strong frequency components in the low-frequency range. The advantages of this will be described comprehensively hereinafter.

By means of the apparatus shown in FIG. 1 the light-sensitive layer 5 is scanned along a spiral path. Moreover, the scanning spot 20 is radially oscillated to and fro over a small distance within the range B1 at a frequency corresponding to the frequency fc' of the output signal of the frequency modulator 32. As a result of this, the spiral path described by the scanning spot 20 on the light-sensitive layer 5 exhibits a radial excursion whose frequency is modulated with the position-information signal Ip. The light-sensitive layer 5 thus scanned, which layer consists of a photoresist, is subsequently developed to remove the portions of the radiation-sensitive layer which were scanned by the light beam b, yielding a master disc in which a spiral groove with a radial frequency-modulated excursion (wobble) is formed. Subsequently, replicas are made of this master disc, which replicas are provided with a radiation-sensitive information layer. FIG. 4 shows a record carrier 40 in accordance with the invention, manufactured as described in the foregoing.

FIG. 4a is a plan view of the record carrier 40. The record carrier 40 exhibits a track pattern comprising a spiral groove 41 of constant width provided with the radial wobble. For the sake of clarity the pitch of the spiral and the radial wobble are strongly exaggerated. In reality, the pitch of the consecutive turns of the spiral path is generally of the order of magnitude of 1 to 2 um. In practice the period is suitably such that during reading of an information signal recorded on the record carrier the frequency components produced in the read signal by the radial wobble are situated substantially outside the frequency spectrum of the information signal to be recorded and/or read. If an EFM encoded signal in conformity with the customary "Compact Disc" standard is recorded a radial wobble causing frequency components near 22 kHz in the read signal with a frequency excursion of 1.5 kHz proves to be adequate. The recorded EFM encoded signal and the radial wobble then hardly influence one another.

FIG. 4b is a sectional view I—I of the record carrier 40 comprising a substrate 42, a radiation-sensitive information layer 43, and a transparent coating 44.

Figure 7B:
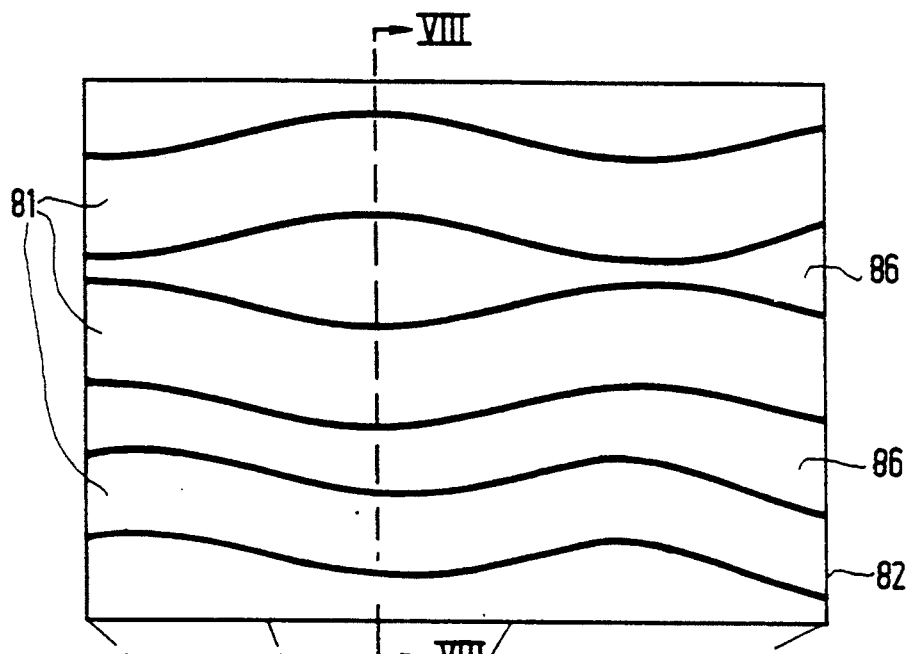
FIGS. 7a, 7b and 8 show another embodiment of the record carrier in accordance with the invention.
Figure 7A:
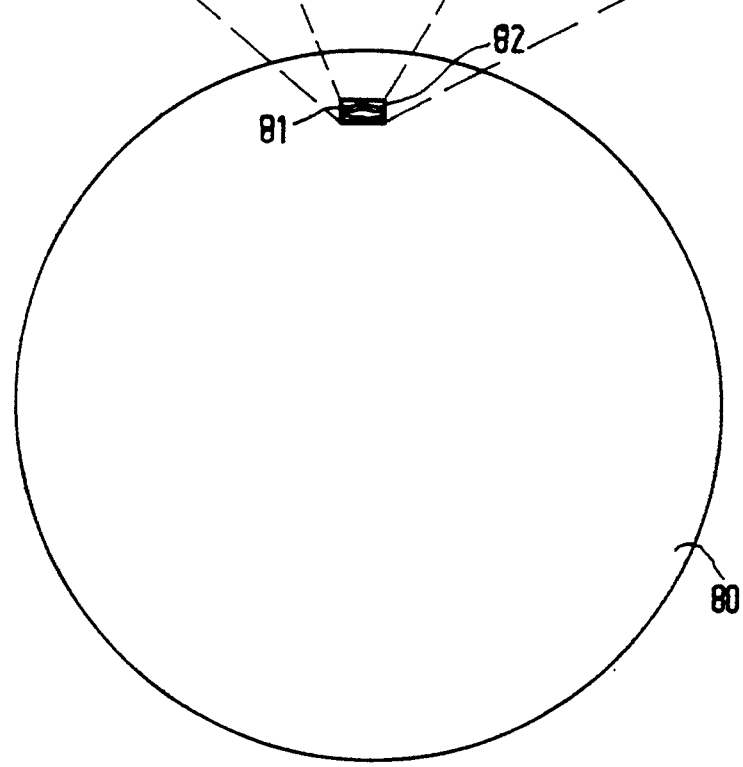
Figure 8:
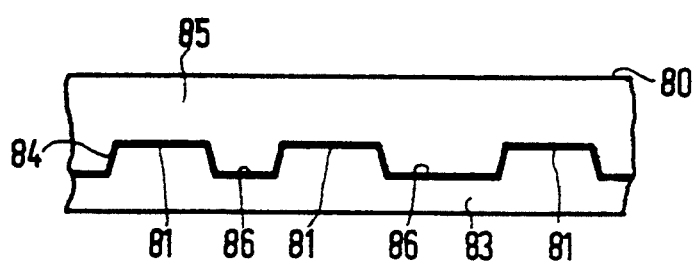

The record carrier shown in FIG. 4 exhibits a track pattern constituted by a spiral-shaped groove of constant width. In such an information carrier the information to be recorded is provided in the groove. However, in practice it has been found that a better signal-to-noise ratio can be obtained if use is made of a record carrier having a track pattern consisting of spiral-shaped or concentric ridges of constant width, on which ridges the information is recorded. Such a record carrier 80 is shown in FIGS. 7a and 7b. The information tracks in the form of ridges 81 are shown only diagrammatically in FIG. 7a for an area 82 which is shown to a highly enlarged scale in FIG. 7b. FIG. 8 is a sectional view taken on the line VIII—VIII within the area 82 of the record carrier 80 which comprises a substrate 83, a radiation-sensitive layer 84, and a transparent coating 85.

Since in the record carrier 80 the diameter of the grooves 86 interposed between the ridges 81 is not constant, because of the frequency-modulated radial excursion of the ridges 81, the method of manufacturing differs from the method for manufacturing record carriers having a track pattern comprising grooves of constant width as described with reference to FIG. 1.

Such a track pattern of ridges of constant width can be obtained by using a method which bears much resemblance to the method described with reference to FIG. 1. However, in the present case the light-sensitive layer 5 should not consist of a positive photoresist but of a negative photoresist. When a layer consisting of such a negative photoresist is developed the non-exposed portions of the photoresist are removed instead of the exposed portions, as is the case with the customary positive photoresist, so that a master disc which exhibits the desired track pattern of ridges is obtained, of which copies can be made in the customary manner.

However, a record carrier with a track pattern of ridges of constant width can also be obtained by use is made of a master disc having a substrate 4 with a light-sensitive layer 5 consisting of the customary positive photoresist, the exposed portions of the layer being removed during development. In that case the substrate 4 will have a track pattern of grooves of constant width which is the complement of the desired track pattern of ridges of constant width. The winding sense of such a complementary track pattern of grooves is opposite to that of the desired track pattern. Thus, to obtain a substrate with a complementary track pattern it is merely necessary to select the direction of rotation during scanning of the substrate 4 so as to be opposite to the direction of rotation desired during reading of the record carrier 80. The process of scanning the substrate 4 can then be controlled in the same way as described with reference to FIG. 1.

After development of the scanned light-sensitive layer 5 the scanned portions of the layer are removed, yielding a master disc with the complementary grooved track pattern. The master disc thus obtained, and any copies thereof, may be used as a negative for the manufacture of constant width.

In the last-mentioned method of manufacturing record carriers with a track pattern of ridges the upper sides of the ridges on the record carrier thus manufactured correspond to the bottoms of the grooves in the master disc. The bottoms of the grooves are constituted by the very smooth surface of the substrate 4, which substrate 4 generally consists of glass. As a result of this, the corresponding upper side of the finished record carrier is also very smooth, which results in a very high reflection, yielding a high signal level and, consequently, a satisfactory signal-to-noise ratio during reading.

An even better signal-to-noise ratio can be obtained if the ridges of constant width on the record carriers are broad relative to the intermediate grooves. The influence of any irregularly formed edges of the ridge, which may give rise to an additional noise during reading, is then minimal.

FIG. 5 shows an apparatus 50 in accordance with the invention for recording an information signal Vi on the record carrier 40. The apparatus 50 comprises a drive means 52 for rotating the record carrier 40 which is placed on a turntable 51. A radiation source 53 produces a radiation beam 54 for scanning the groove 41. The radiation beam 54 is then directed towards the record carrier 40 via a modulation device 55 and a semitransparent mirror 56. By means of the modulation device 55 the intensity of the beam 54 can be modulated depending on an information signal Vi to be recorded, in such a way that an optically detectable information pattern is formed in the information layer 43 at the location of the groove 41. The modulated beam 54 is then partly reflected by the information layer 43. The reflected beam is detected by means of a detection circuit 57. The detection circuit 57 generates an output signal containing frequency components produced by the radial wobble. This output signal is filtered by a band-pass filter 58 which mainly transmits the frequency components caused by the radial wobble. The mean value of the instantaneous frequency fs of this output signal is employed as a clock signal for controlling the velocity with which the record carrier is scanned by the beam 54 (scanning velocity). The output signal of the band-pass filter 58 is applied to a control circuit 59 for generating a control signal for the drive means 52. The control circuit 59 controls the speed of rotation of the record carrier 40 via the drive means 52 so as to maintain the mean value of the instantaneous frequency fs substantially equal to a reference frequency fref. The control loop thus formed for controlling the scanning velocity of the record carrier has a limited bandwidth, so that rapid frequency variations of the instantaneous frequency fs due to frequency components outside this limited bandwidth do not affect the velocity control. As already described, in the apparatus in FIG. 1 for manufacturing the record carrier the frequency of the radial wobble is modulated with a position-information signal Ip which does not exhibit any strong frequency components in the low-frequency range. If the frequency band used for scanning-velocity control and the frequency spectrum of the position-information signal are adapted to one another in such a way that hardly any frequency components of this frequency spectrum are situated within the velocity control frequency band, the applied modulation of the radial wobble frequency will not affect the controlled scanning velocity.

Satisfactory results when recording EFM encoded signals in conformity with the CD-standard have been obtained for an fref of approximately 22 kHz, a bit frequency of the position-information signal of approximately 3000 bits/second, and a velocity-control bandwidth of approximately 100 Hz.

The position-information signal Ip is recovered from the output signal of the filter 58 by means of an FM demodulation circuit 60. This position-information signal indicates the position of the scanned portion of the groove 42 relative to the beginning of the groove expressed in playing time. This position-information signal Ip may be used inter alia for locating the track portion in which an information signal to be recorded is to be stored. Locating this portion falls beyond the scope of the present invention and is therefore not described any further.

FIG. 6 shows an apparatus 70 in accordance with the invention for reading the information signal Vi recorded on the record carrier 40, elements corresponding to elements of the apparatus 50 shown in FIG. 5 bearing the same reference numerals. In the apparatus 70 the record carrier 40 on which the information signal Vi is recorded is scanned by a radiation beam 54a produced by a radiation source 53a. The intensity of the radiation beam 54a is too low to produce a change in the optical properties of the information layer 43, so that the information pattern already formed is not overwritten. The information pattern in the spiral groove wit the radial wobble modulates and subsequently reflects the radiation beam 54a. The reflected modulated radiation beam 54a is detected by a detection device 57a. The detection device 57a comprises a first section having an increased sensitivity to the frequency modulation of the light beam produced by the radial wobble and a second section having an increased sensitivity to the frequency modulation produced by the information pattern. Such a detection device is described in detail in the aforementioned published West German Offenlegungsschrift no. 3100421. The signal generated by the first section of the detection circuit 57a is applied to a filter 71 for removing frequency components produced by the radial wobble for velocity control, so that the information signal Vi becomes available on the output of the filter 71. In the same way as described with reference to FIG. 5 the scanning velocity is controlled by means of a control circuit 59 and the position-information signal Ip is recovered by means of the FM demodulation circuit 60. Subsequently, the signal Ip may De used, for example, for locating specific portions of the record carrier or for displaying the playing time during reading of the recorded information.

In the foregoing the apparatus for recording information and the apparatus for reading the recorded information have been described as two separate apparatuses. It will be obvious to those skilled in the art that the two apparatuses may be readily combined to form a single apparatus both for recording and reading.

In the foregoing a track modulation in the form of a radial wobble has been provided for the purpose of scanning-velocity control in the reading and recording apparatus. It will be evident that other track modulations are also suitable for this purpose, for example those as described in published West German Offenlegungsschrift no. 3100278 which corresponds to U.S. Pat. No. 4,375,088, issued Feb. 22, 1983; and the aforementioned and no. 3100421. In order to obtain a suitable track modulation care must be taken only that the scanning-beam modulation produced by the track modulation can be distinguished from the scanning-beam modulation caused by the information signal Vi, and that the frequency components of these scanning-beam modulations are situated substantially outside the frequency band used for scanning-velocity control.

What is claimed is:

1. A record carrier comprising a disc-shaped substrate having a spiral or concentric pattern of tracks on a surface thereof and the radiation-sensitive layer extending over the track pattern, said tracks being adapted to have information recorded thereon and read therefrom by a scanning beam of radiation which successively scans the successive tracks and produces detectable radiation therefrom; characterized in that:

said tracks are in the form of ridges of substantially constant width which extend to a uniform height above the surface of said substrate;

each track has a periodic wobble in a radial direction on said substrate which during scanning of a track modifies the radiation therefrom in accordance with a frequency modulated clock signal, the frequency modulation of said clock signal constituting a digital position-information signal;

the clock signal of each track has a frequency corresponding to the speed of scanning of said track, whereby it is adapted for use as a scanning speed control signal; and the digital position-information signal of each track identifies successive positions along said track and the relative position of said track in the track pattern.

2. A record carrier as claimed in claim 1, characterized in that the width of each of said ridges exceeds the average spacing between successive ridges.

3. A method of manufacturing a record carrier having a spiral or concentric pattern of tracks on a surface of a disc-shaped substrate, said tracks being adapted to have information recorded thereon and read therefrom by a beam of radiation which successively scans the successive tracks; said method comprising the steps of:

providing a first disc-shaped substrate having a radiation-sensitive layer on a surface thereof;

scanning said layer with a radiation beam which follows a succession of spiral-shaped or substantially concentric paths thereon along which said layer is exposed to said beam, each path having a periodic radial wobble having a waveform which comprises a substantially constant frequency clock signal which is frequency-modulated by a digital position-information signal, said position-information signal identifying successive positions along said path and the relative position of said path on said substrate, the frequency of said clock signal corresponding to the speed of scanning of said path by the radiation beam;

developing said layer so as to remove portions thereof defined by said scanning paths and thereby form a pattern of tracks in said layer corresponding to said scanning paths, each such track being of uniform width transverse to the track direction, said first substrate and the track pattern so formed thereon constituting a master disc for producing copies thereof; and copying the track pattern on said master disc onto a second disc-shaped substrate so as to form a pattern of ridged tracks thereon corresponding to the track pattern on said master disc, the clock signal and the position-information signal of each track both being recoverable from the periodic radial wobble of said track; said second substrate and the ridged track pattern so formed thereon constituting said record carrier.

4. A method as claimed in claim 3, wherein said surface of said first substrate is a precisely flat planar surface, said radiation-sensitive layer on said first substrate is a positive photoresist and is developed so as to remove the exposed portions thereof, thereby forming a pattern of grooved tracks in said layer corresponding to said scanning paths, the bottom of each track groove being at the flat planar surface of said first substrate, the grooved track pattern on said first substrate being the complement of the ridged track pattern copied therefrom on said second substrate, whereby the precisely flat planar surface of said first substrate results in a corresponding precisely flat planar top surface of the tracks in the ridged track pattern formed on said second substrate.

5. A method as claimed in claim 3 wherein said radiation-sensitive layer on said first substrate is a negative photoresist and is developed so as to remove the non-exposed portions thereof, thereby forming a pattern of ridged tracks in said layer corresponding to said scanning paths; the ridged track pattern on said first substrate being the same as the ridged track pattern copied therefrom on said second substrate.

* * * * *